United States Patent
Rayburn et al.

(10) Patent No.: US 7,336,963 B1
(45) Date of Patent: Feb. 26, 2008

(54) METHOD AND SYSTEM FOR DELIVERING LOCATION INFORMATION THROUGH A VOICE MESSAGING SYSTEM

(75) Inventors: Terry G. Rayburn, Kansas City, MO (US); Robert H. Miller, Leawood, KS (US); Michael P. McMullen, Prairie Village, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 625 days.

(21) Appl. No.: 10/444,038

(22) Filed: May 22, 2003

(51) Int. Cl.
*H04Q 7/20* (2006.01)

(52) U.S. Cl. ............... 455/456.3; 455/456.1; 370/469; 701/221

(58) Field of Classification Search ............ 455/456.5, 455/466, 456.6, 412.1; 370/469; 379/201.07, 379/88.12; 704/275; 701/211
See application file for complete search history.

(56) References Cited

U.S. PATENT DOCUMENTS

| | | | |
|---|---|---|---|
| 4,371,752 A | 2/1983 | Matthews et al. ............ 179/7.1 |
| 5,315,636 A * | 5/1994 | Patel ..................... 379/201.07 |
| 5,631,948 A | 5/1997 | Bartholomew et al. ....... 379/67 |
| 5,884,159 A * | 3/1999 | Thro et al. ............... 455/412.1 |
| 5,963,866 A * | 10/1999 | Palamara et al. ......... 455/456.5 |
| 6,157,827 A | 12/2000 | Fujiwara ..................... 455/413 |
| 6,389,276 B1 | 5/2002 | Brilla et al. ................ 455/413 |
| 6,546,084 B1 * | 4/2003 | Castagna ................. 379/88.12 |
| 2002/0126701 A1 * | 9/2002 | Requena ..................... 370/469 |
| 2002/0137524 A1 | 9/2002 | Bade et al. ................. 455/456 |
| 2002/0164993 A1 | 11/2002 | Elliot ........................ 455/456 |
| 2004/0006478 A1 * | 1/2004 | Alpdemir et al. ........... 704/275 |
| 2004/0162674 A1 * | 8/2004 | Fan et al. ................... 701/211 |
| 2004/0210442 A1 * | 10/2004 | Glynn et al. ................ 704/275 |
| 2005/0020287 A1 * | 1/2005 | Pohutsky et al. ........... 455/466 |
| 2005/0176444 A1 * | 8/2005 | Tanaka .................... 455/456.6 |

OTHER PUBLICATIONS

Invertix Corporation IM Anywhere Privacy Management System, http://www.invertix.com/products_features_privacymanagement. html, printed from the World Wide Web on Aug. 14, 2001.

(Continued)

*Primary Examiner*—Joseph Feild
*Assistant Examiner*—Phuoc Doan (57) ABSTRACT

A method and system for delivering location information through a voice messaging system is provided. A mobile subscriber may be directed to a voice messaging system if a party is unavailable or chooses not to accept the call. The mobile subscriber may indicate to the voice messaging system that he would like to have his location information be made available to the party. The voice messaging system may contact a location system to obtain the location of the mobile subscriber based on the location of the mobile subscriber's terminal. The party may retrieve the mobile subscriber's location information from the voice messaging system.

30 Claims, 4 Drawing Sheets

OTHER PUBLICATIONS

Followap Telecommunications, iFollow Products Family, http://www.followap.com/shtm/ifollow_main.shtml, printed from the World Wide Web on Aug. 14, 2001.

Invertix Corporation IM Anywhere Mobile Buddy List Features, http://www.invertix.com/products_features_mobilebuddylist.html, printed from the World Wide Web on Aug. 14, 2001.

Wireless Developer Network, Addition of Location Management to Wireless IM Set to Drive GPRS Adoption, http://www.wirelessdevnet.com/news/2001/23/news2.html, printed from the World Wide Web on Aug. 14, 2001.

GartnerGroup, Yahoo!Find-a-Friend: Wireless or Borderless Privacy? http://gartner11.gartnerweb.com/public/static/hotc/hc00088645.html, printed from the World Wide Web on Sep. 6, 2001.

Ericsson, www.telecomcorridor.com/wireless%20horizons/1Coyne.pdf, printed from the World Wide Web on Jun. 27, 2001.

* cited by examiner

METHOD AND SYSTEM FOR DELIVERING LOCATION INFORMATION THROUGH A VOICE MESSAGING SYSTEM

BACKGROUND

1. Field of the Invention

The present invention relates to mobile communications and, more particularly, to methods and systems for delivering location information through a voice messaging system.

2. Description of Related Art

Cellular wireless is an increasingly popular means of personal communication in the modern world. People are using cellular wireless networks for the exchange of voice and data over cellular telephones, Personal Digital Assistants ("PDAs"), cellular telephone modems, and other devices. In principle, a user can seek information over the Internet or call anyone over a Public Switched Telephone Network ("PSTN") from any place inside the coverage area of the cellular wireless network.

An important feature of contemporary cellular wireless networks is an ability to locate the geographical position of a mobile subscriber terminal. Such a feature was developed to assist emergency services in locating a mobile subscriber terminal. For example, in the United States, the Federal Communications Commission ("FCC") has mandated the implementation of "Enhanced 911" ("E911") services.

The E911 mandate was divided into two phases. According to Phase 1, the location must be identified with an accuracy of at least cell and sector. As this information is typically maintained by a wireless cellular carrier in a subscriber's home location register ("HLR"), Phase 1 presents little technical challenge. According to Phase 2, the location must be provided with an accuracy of at least 200 meters (or 50 meters for handset-originated methods such as global position satellite ("GPS") systems), which is far more granular than the cell and sector information maintained in the HLR. In response, the Telecommunications Industry Association ("TIA") has proposed a new standard for "Enhanced Wireless 9-1-1, Phase 2" or "TIA/ELA/IS-J-STD-036" ("J-STD-036"), the entirety of which is hereby incorporated by reference.

In order to achieve the accuracy specified by Phase 2, a cellular wireless network may employ special position determining equipment and techniques. Alternatively, a mobile subscriber terminal itself may employ a position determining system such as a GPS system and may relay its position to the network, for reference by the emergency services. The emergency services may then use the position of the mobile subscriber terminal to help assist a user of the mobile subscriber terminal.

Cellular wireless carriers and third party application providers have recognized the commercial significance of this new-found location information, well beyond use of the information for emergency services. In particular, knowing where a mobile subscriber terminal is located, a service provider may now provide a wide range of valuable location-based services.

One such service is reporting the location of a mobile subscriber. For instance, when a mobile subscriber engages in a communication session with another party, the wireless carrier can determine the location of the mobile subscriber and notify the other party of the mobile subscriber's location. Typically, the wireless carrier maintains a list of pre-approved names that may receive the location of the mobile subscriber.

SUMMARY

Sometimes the other party is not available when the mobile subscriber wants to notify the other party of the mobile subscriber's location. When the other party is not available, the mobile subscriber may be directed to a voice messaging system. While the mobile subscriber can leave a message for the other party telling the other party where the mobile subscriber is located, the mobile subscriber may not know his location. Alternatively, the mobile subscriber may know where he is, but may not be able to give the other party directions to his location. In these situations, it would be beneficial if the wireless carrier could provide the other party with the location of the mobile subscriber.

Because the other party is unavailable, there needs to be a way for the wireless carrier to provide the mobile subscriber's location to the other party when the other party becomes available. When the other party checks their voice mailbox for messages, the party may receive a voice message from the mobile subscriber. It would be ideal if the mobile subscriber's location could be provided to the other party while the party is retrieving the voice message left by the mobile subscriber. Therefore, it would be desirable to deliver the mobile subscriber's location information to a party through a voice messaging system.

The present invention provides a method and system for delivering location information through a voice messaging system. According to an exemplary embodiment of the invention, a first party operating a mobile subscriber terminal makes a call to a second party. The second party is unavailable to receive the call or chooses not to accept the call, so the first party is directed to a voice messaging system. Alternatively, the first party may directly call the second party's voice mailbox on the voice messaging system.

The first party indicates to the voice messaging system that he desires to have his location be made available to the second party. The voice messaging system determines a location of the mobile subscriber terminal and stores the location and a voice message in data storage. Thereafter, the voice messaging system delivers to the second party the voice message and the location of the mobile subscriber terminal. Accordingly, the first party may allow access to his location information without maintaining a list of names of parties that are pre-approved to receive such information. Additionally, the first party may allow access to his location information without requiring special equipment.

The voice messaging system may obtain the location of the mobile subscriber terminal using a location system. The location system may include a mobile position center and a position determining entity. The mobile position center may be a database application that is operable to store and/or report the location of the mobile subscriber terminal to the voice messaging system. The position determining entity may receive position information from a mobile subscriber terminal, process the position information, and forward the position information to the mobile position center.

BRIEF DESCRIPTION OF THE DRAWINGS

An exemplary embodiment of the present invention is described herein with reference to the drawings, in which.

DETAILED DESCRIPTION

Figure 1:
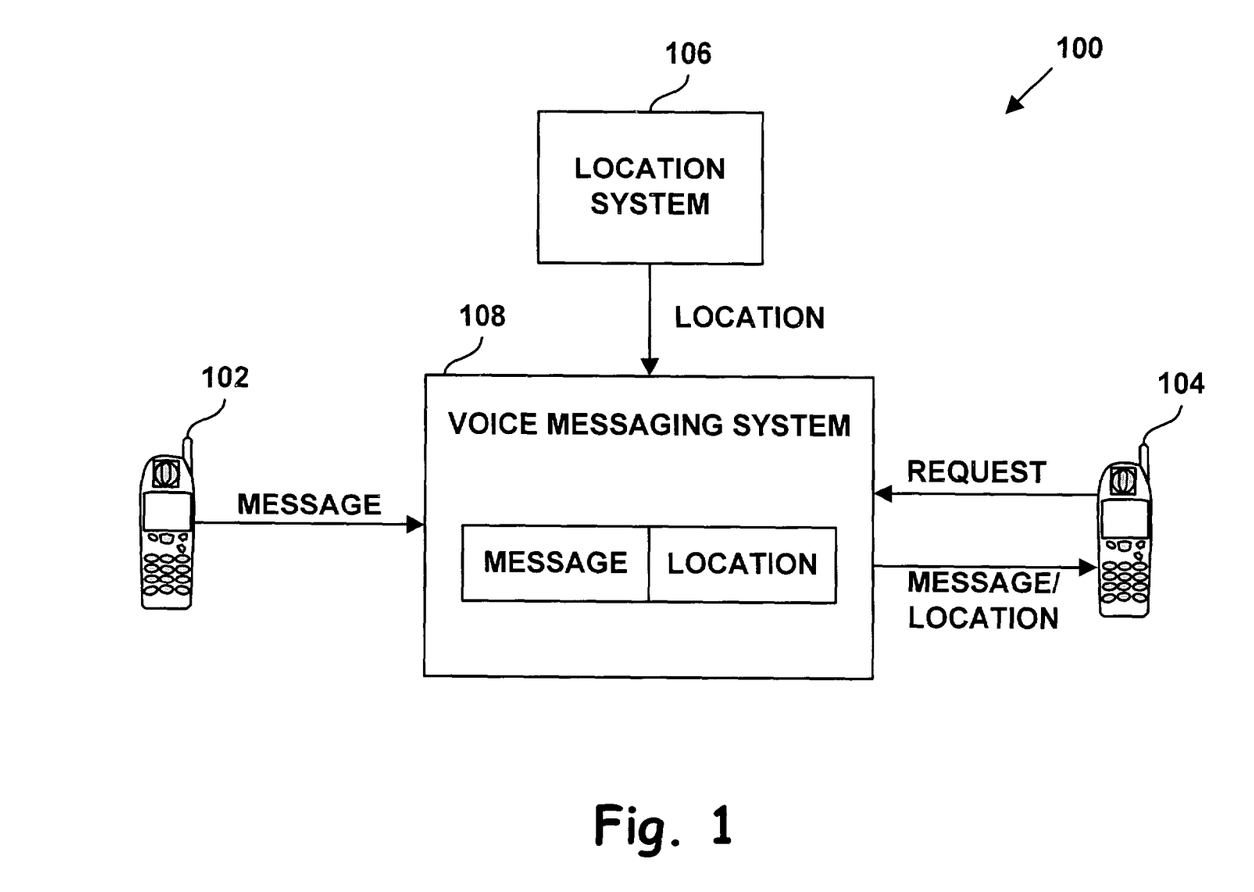
FIG. 1 is a block diagram of a message flow for delivering location information through a voice messaging system, according to the exemplary embodiment.

FIG. 1 is a simplified block diagram of a message flow 100 for delivering location information through a voice messaging system according to an exemplary embodiment. The system 100 includes a mobile subscriber terminal 102, a terminal 104, a location system 106, and a voice messaging system 108. The system 100 may also include other entities not depicted in FIG. 1.

Figure 2:
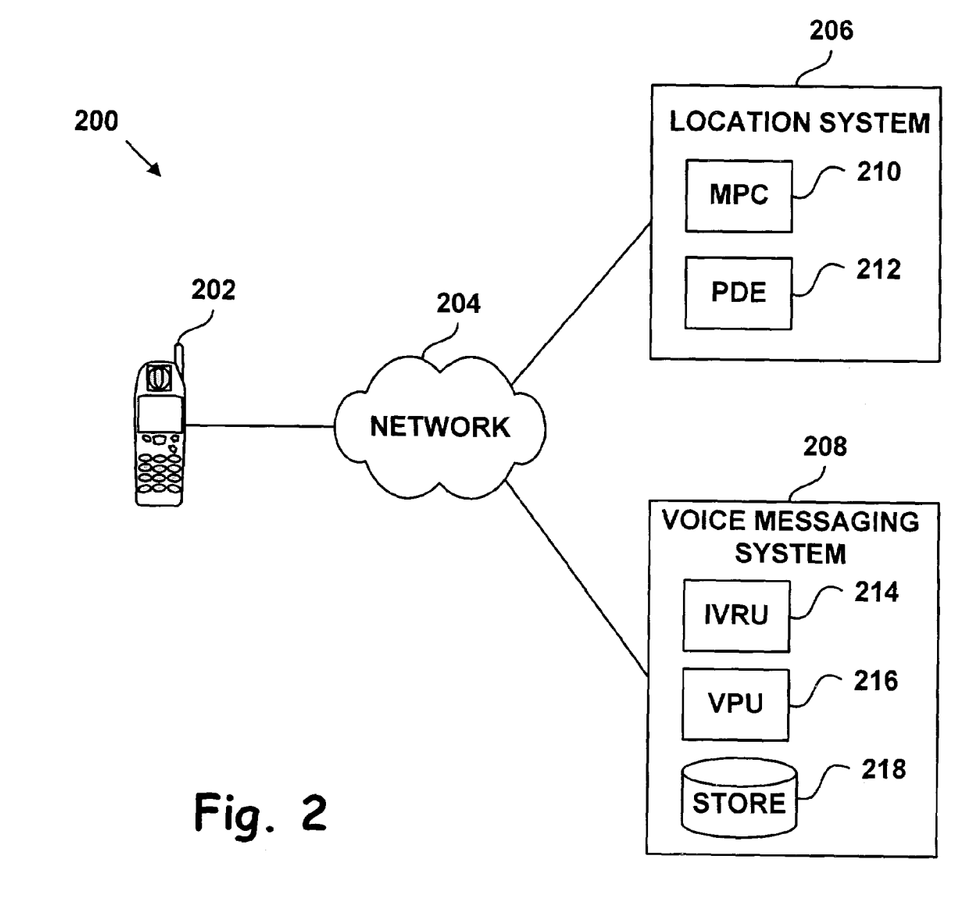
FIG. 2 is a block diagram of a system for delivering location information through a voice messaging system, according to the exemplary embodiment.

The mobile subscriber terminal 102 is depicted in FIG. 1 as a cellular telephone. However, the mobile subscriber terminal 102 may be any device that can be located by the location system 106. For example, the mobile subscriber terminal 102 may be a landline telephone, a computer, or a device having a GPS chipset. The terminal 104 is depicted in FIG. 2 as a cellular telephone. However, the terminal 104 may be any device that can obtain voice messages from the voice messaging system 108. For example, the terminal 104 may be a landline telephone, a personal digital assistant, or a computer.

The location system 106 may function to determine and/or report the location of mobile subscriber terminals, such as the mobile subscriber terminal 102. As such, the location system 106 could take a variety of forms. For example, the location system 106 could comprise a mobile position center ("MPC") and a position determining entity ("PDE") as defined by J-STD-036, with which those skilled in the art are very familiar.

The voice messaging system 108 may function to store voice messages left by the mobile subscriber using the mobile subscriber terminal 102 and location information obtained from the location system 106. Additionally, the voice messaging system 108 may function to provide the voice message and the location information to a requesting party.

A mobile subscriber using the mobile subscriber terminal 102 may call a party for any reason. For example, the mobile subscriber may want to give the party the subscriber's location based on the location of the subscriber's mobile subscriber terminal 102. However, the party may not be available to receive the call or chooses not to accept the call, and the mobile subscriber may be directed to a voice mailbox assigned to the party on the voice messaging system 108. Alternatively, the first party may directly call the second party's voice mailbox on the voice messaging system.

The mobile subscriber may leave a message on the voice messaging system 108 for the party. The voice message may be stored in voice messaging system 108. The mobile subscriber may also indicate to the voice messaging system 108 that he would like to provide the location of his mobile subscriber terminal 102 to the party. The mobile subscriber may indicate that he would like to provide a previous location, a current location, and/or a future location of the mobile subscriber terminal 102 to the party. The mobile subscriber may also indicate that he would like to provide the party the ability to track the location of the mobile subscriber terminal 102 for a period of time.

The voice messaging system 108 may request the location of the mobile subscriber terminal 102 from the location system 106. The location system 106 may obtain the location of the mobile subscriber terminal 102 and provide the location information to the voice messaging system 108. The voice messaging system 108 may store the location information with the voice message.

Later, the party may contact the voice messaging system 108 using terminal 104 to check if there are any messages in the party's voice mailbox. The voice messaging system 108 may indicate to the party that both the voice message and the location information are available. The party may request the voice message and/or the location information from the voice messaging system 108. The voice messaging system 108 may provide the voice message and the location information to the party. In this way, the mobile subscriber is able to provide his location information to the party without requiring the party's name to be placed on a pre-approved list of parties that are authorized to receive such information. Additionally, the first party may allow access to his location information without requiring special equipment.

FIG. 2 is a simplified block diagram of a system 200 for delivering location information through a voice messaging system according to an exemplary embodiment. The system 200 includes a mobile subscriber terminal 202, a network 204, a location system 206, and a voice messaging system 208. The system 200 may also include other entities not depicted in FIG. 2. The mobile subscriber terminal 202, the location system 206, and the voice messaging system 208 may all be connected to the network 204. Alternatively, the voice messaging system 208 may be directly connected to the location system 206.

The connections between the network 204 and each of the mobile subscriber terminal 202, the location system 206, and the voice messaging system 208 can take a variety of forms. Further, each connection could comprise various elements, such as wired or wireless connections, direct end-to-end connections, and one or more transport networks, whether packet-switched or circuit-switched. For example, the connection between the mobile subscriber terminal 202 and the network may be a wireless connection, while the connection between the network 204 and both the location system 206 and the voice messaging system 208 may be a wired connection. Additionally, each connection could operate according to any of a variety of protocols.

The mobile subscriber terminal 202 may be substantially the same as the mobile subscriber terminal 102 as described with reference to FIG. 1. According to an exemplary embodiment, the mobile subscriber terminal 202 may be a third generation ("3G") or later mobile station capable of simultaneously engaging in voice and data sessions. The 3G mobile station preferably operates in compliance with the 3GPP/3GPP2 industry specifications, with which those skilled in the art are very familiar. (The 3GPP/3GPP2 industry specifications may be found at www.3gpp.org and www.3gpp2.org, respectively.) The mobile subscriber terminal 202 may communicate via an air interface with a base transceiver station, which may provide connectivity to a base station controller. The base station controller in turn may provide connectivity with a mobile switching center, which may function as a gateway to the network 204.

The network 204 may be a packet-switched network, such as the Internet. The network 204 may be a wired or a wireless network. The network 204 may be a public or a private network. Other entities not shown in FIG. 2 may also be connected to the network 204.

The location system 206 may be substantially the same as the location system 106 as described with reference to FIG. 1. Accordingly, the location system 206 may function to determine and/or report the location of mobile subscriber terminals, such as the mobile subscriber terminal 202. As such, the location system 206 could take a variety of forms. For example, the location system 206 could comprise a MPC 210 and a PDE 212.

The MPC 210 may be a database application operable to store and/or report locations of a mobile subscriber terminal. The MPC 210 may obtain and store location tags received from the PDE 212. A location tag may be one or more digital bit strings that contain location information corresponding to the location of the mobile subscriber terminal 202. The location information may correspond to longitude and latitude coordinates (geocode), cell and sector information, or any other data representation of the location of the mobile subscriber terminal 202.

For example, the location tag may be two 24-bit numerically encoded data strings. All six bytes may include the location information. However, other information may be included in the data strings. One bit may be used to indicate whether any location information delivery options have been selected. Other bits may be assigned to the different location information delivery options or be unassigned. The location information delivery options may include, but are not limited to, whether the location information may be forwarded to a third party, how long the location information may be stored on the voice messaging system, and whether updated location information may be obtained.

Additionally, the mobile subscriber may indicate when the location system 206 may obtain the location of the mobile subscriber terminal 202. For example, the location system 206 may only be permitted to obtain the location of the mobile subscriber terminal 202, either while the mobile subscriber is leaving the voice message and/or when the other party retrieves the voice message. As another example, the location system 206 may be permitted to obtain the location of the mobile subscriber terminal 202 for a period of time, allowing the party to track the mobile subscriber. Also, the mobile subscriber may indicate that a previous location of the mobile subscriber terminal 202 should be provided to the other party.

When the MPC 210 receives a request for location information from a requesting entity, the MPC 210 may select a PDE, such as PDE 212, to determine the position of a mobile subscriber terminal, such as terminal 202. The MPC 210 may then request the location information of the mobile subscriber terminal 202 from the selected PDE 212. The request for the location information may include details regarding the mobile subscriber terminal, such as a mobile identification number, so that the PDE 212 can determine the location of the requested mobile subscriber terminal. When the MPC 210 receives the location of the mobile subscriber terminal 202 from the PDE 212, the MPC 210 may forward the information to the requesting entity.

In one embodiment, the location system 206 may include a text-to-speech converter. The text-to-speech converter may be operable to convert text into outgoing digitized speech signals, as is well known in the art. Accordingly, the location system 206 may be operable to convert the location information obtained by the MPC 210 into digitized speech signals, which may be recognized by requesting entity. Alternatively, the location system 206 may forward the location information to a stand-alone text-to-speech converter or a text-to-speech converter that is co-located with another entity.

The PDE 212 may be any system for determining the location of a mobile subscriber terminal using one or more position determining technologies. The PDE 212 may receive position information from the mobile subscriber terminal 202. The mobile subscriber terminal 202 may use a terrestrial positioning system, a celestial positioning system, or a combination of these systems to determine its position. Terrestrial positioning systems utilize various techniques, such as forward link trilaterization ("FLT"), advanced forward link trilaterization ("AFLT"), amplitude difference, angle of arrival ("AD-AOA"), and enhanced observed time difference ("EOTD"). GPS is an example of a celestial positioning system. The PDE 212 may then process the position information, which may include analyzing pseudo ranges obtained from the mobile subscriber terminal 202. The PDE 212 may determine the position of a mobile subscriber terminal when the mobile subscriber is engaged in a call, in data mode, and/or in idle mode. The PDE 212 may transmit the location tag containing the location information corresponding to the location of the mobile subscriber terminal 202 to the MPC 210.

The voice messaging system 208 may be connected to a telephone switching system (not shown). The telephone switching system may forward incoming calls to the voice messaging system 208 for recording and storing voice messages when a party is unavailable. The voice messaging system 208 may include an interactive voice response unit 214 ("IVRU"), a voice-processing unit 216, and a memory store 218. The voice messaging system 208 may also include a text-to-speech converter. The voice messaging system 208 may include additional components as well.

The IVRU 214 may be a combination of software, firmware, and hardware that accepts a combination of voice telephone inputs and touch-tone keypad selections, and provides appropriate responses. The IVRU 214 may allow a caller to enter information using a remote touch-tone telephone, and may use a digitized synthesized voice to prompt and answer the caller. The IVRU 214 may also be used to collect information.

The IVRU 214 may provide an interface between speech commands or dual tone multi-frequency ("DTMF") keypad selections provided by a user at the mobile subscriber terminal 202 and the voice-processing unit 216. The user at the mobile subscriber terminal 202 may be connected to the IVRU 214 and, by speaking commands or providing keypad selections, browse through navigation points (e.g., applications and/or menu items within the applications) to access and communicate information. The IVRU 214 can thus receive, for instance, spoken commands or keypad selections from the user and use the inputs to guide its execution of voice command applications.

In a preferred embodiment, the IVRU 214 may be a software application. The software application may be written in a variety of computer languages. For example, the IVRU 214 may be programmed in VoiceXML ("VXML"). VXML is a tag-based computer language similar to the HTML language that underlies most Internet web pages. Other languages, such as SpeechML and VpxML, may also be used.

The voice-processing unit 216 may operate to digitize the voice message so the message can be stored in the memory store 218. Accordingly, the voice-processing unit 216 may include an analog-to-digital converter for converting an analog speech signal being received from the user of a mobile subscriber terminal 202 into a digital bit stream. Alternatively, the user's speech signal might already be digitized, such as in a voice-over-IP communication system, in which case analog-to-digital conversion would be unnecessary. Further, the voice-processing unit 216 may also include a digital-to-analog converter for converting the digital bit stream into an analog speech signal. Accordingly, the voice-processing unit 216 may convert a stored voice message into a speech signal when the voice mailbox owner retrieves the voice message.

The memory store 218 may store the voice messages and the location information obtained from the location system 206. The memory store 218 may also include the instructional messages used by the IVRU 214 to direct the mobile subscriber to request that location information be made available to the party and to direct the party to obtain the location information from the voice messaging system 208. The memory store 218 may also store other information, such as conversion data, which may be used to translate the location information into street addresses, driving directions, and/or maps.

The memory store 218 may be a single entity, as depicted in FIG. 1, or may consist of more than one entity. For example, the memory store 218 may include a message store that stores the voice messages, a location store that stores the location information, an IVRU store containing the instructional messages used by the IVRU 214, and a translation store that stores the conversion data.

The memory store 218 may be any memory device operable to store data. The memory store 218 may include volatile and/or non-volatile memory devices. For example, the memory store 218 may be located on a memory chip on a printed circuit board. Alternatively, the memory store 218 may be located on a magnetic or optical drive disk.

Figure 3:
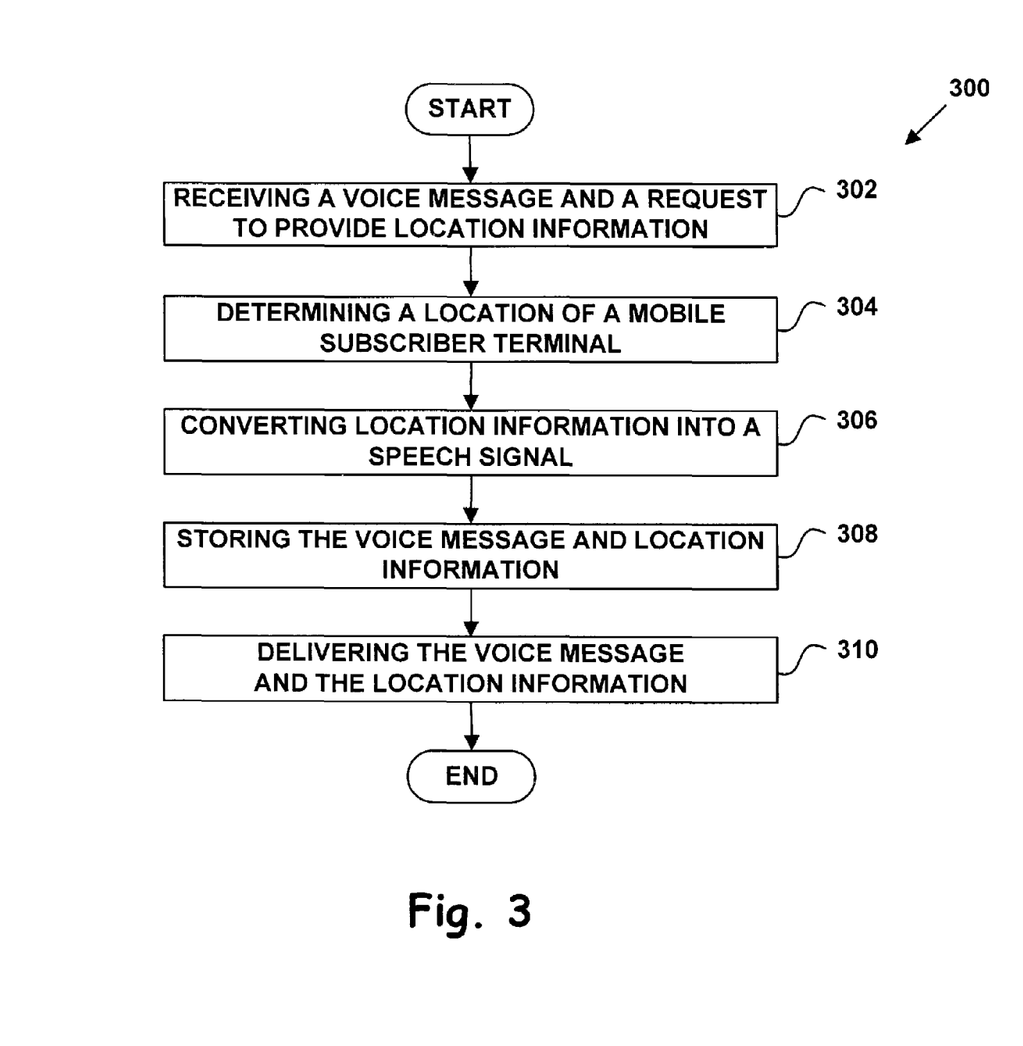
FIG. 3 is a flow chart of a method for delivering location information through a voice messaging system, according to the exemplary embodiment.

FIG. 3 is a flow chart of a method 300 for delivering location information through a voice messaging system, according to an exemplary embodiment. In this embodiment, the location information may be converted into a speech signal prior to being stored in the voice messaging system 208.

At block 302, when the party is unavailable or chooses not to accept a call, the mobile subscriber may be directed to a voice messaging system 208. Alternatively, the mobile subscriber may directly call the party's voice mailbox. The mobile subscriber may leave a voice message for the party on the voice messaging system 208. In addition, the mobile subscriber may be directed by the IVRU 214 located on the voice messaging system 208 to press a key or combination of keys on the mobile subscriber terminal 202 if the mobile subscriber wishes to have his location information be made available to the party. For example, the IVRU 214 may instruct the mobile subscriber to press "*#" after leaving his voice message to have the mobile subscriber terminal's location be made available to the party. Alternatively, the mobile subscriber may make the appropriate key strokes without being directed by the UVRU 214. The key stroke combination may cause one or more DTMF signals to be sent to the voice messaging system 208.

At block 304, after receiving the one or more DTMF signals, the voice messaging system 208 may request the location of the mobile subscriber terminal 202 from the location system 206. The location system 206 may determine the location of the mobile subscriber terminal 202 and report the location to the voice messaging system 208. More specifically, the MPC 210 may select the PDE 212 to obtain the mobile subscriber terminal's location. The PDE 212 may obtain the location of the mobile subscriber terminal 202 and forward a location tag containing the location information of the mobile subscriber terminal's location to the MPC 210.

At block 306, depending on the type of location information in the location tag, the location system 206 may translate the location tag into a street address or other user-friendly data format, such as driving instructions or a map. The location system 206 may then convert either the location tag or the associated translation into a speech signal using a text-to-speech converter. Alternatively, another entity may provide the text-to-speech conversion. The voice messaging system 208 may receive the location information speech signal as an analog signal. Thus, the voice messaging system 208 may receive the location information in substantially the same format as the voice message.

At block 308, the voice messaging system 208 may then convert the analog signals representing the voice message and the speech signal into a digital bit stream, which may then be stored in the message store 218. The conversion of the voice message and the speech signal into the digital bit stream may be performed using the analog-to-digital converter located within the voice-processing unit 216.

At block 310, the party may retrieve the voice message from the voice messaging system 208. The voice message retrieved may include both the mobile subscriber's voice message and the location information. The digital-to-analog converter in the voice-processing unit 216 may convert the stored voice message and location information into an analog speech signal.

For example, the party may hear a first message: "We will be at the restaurant until 10 pm. Meet us if you can." Then the party may hear a second message: "111 North Main Street, Springfield." The first message may be the voice message left by the mobile subscriber, while the second message may be the location information the voice messaging system 208 obtained from the location system 206. The second message may also include driving instructions to 111 North Main Street, Springfield.

Alternatively, the party may retrieve the voice message and be provided an indication that location information is available for retrieval. For example, the voice messaging system 208 may provide an audible tone indicating that location information is available. As another example, the UVRU 214 may inform the party that location information is available. The IVRU 214 may instruct the party to press a key or combination of keys on her phone if the party wishes to retrieve the location information. The party may be instructed to press the same or a different series of keys than what the mobile subscriber pressed when leaving the message. If the party indicates that she wants to retrieve the location information of the mobile subscriber, the voice messaging system 208 may provide location information obtained from the location system 206.

The party may obtain the location of the mobile subscriber terminal 202 when the mobile subscriber was leaving the voice message or when the party retrieves the voice message. Alternatively, the party may be permitted to obtain the location of the mobile subscriber terminal 202 for a period of time, allowing the party to track the mobile subscriber. Also, the party may obtain a previous location of the mobile subscriber terminal 202 as selected by the mobile subscriber.

Figure 4:
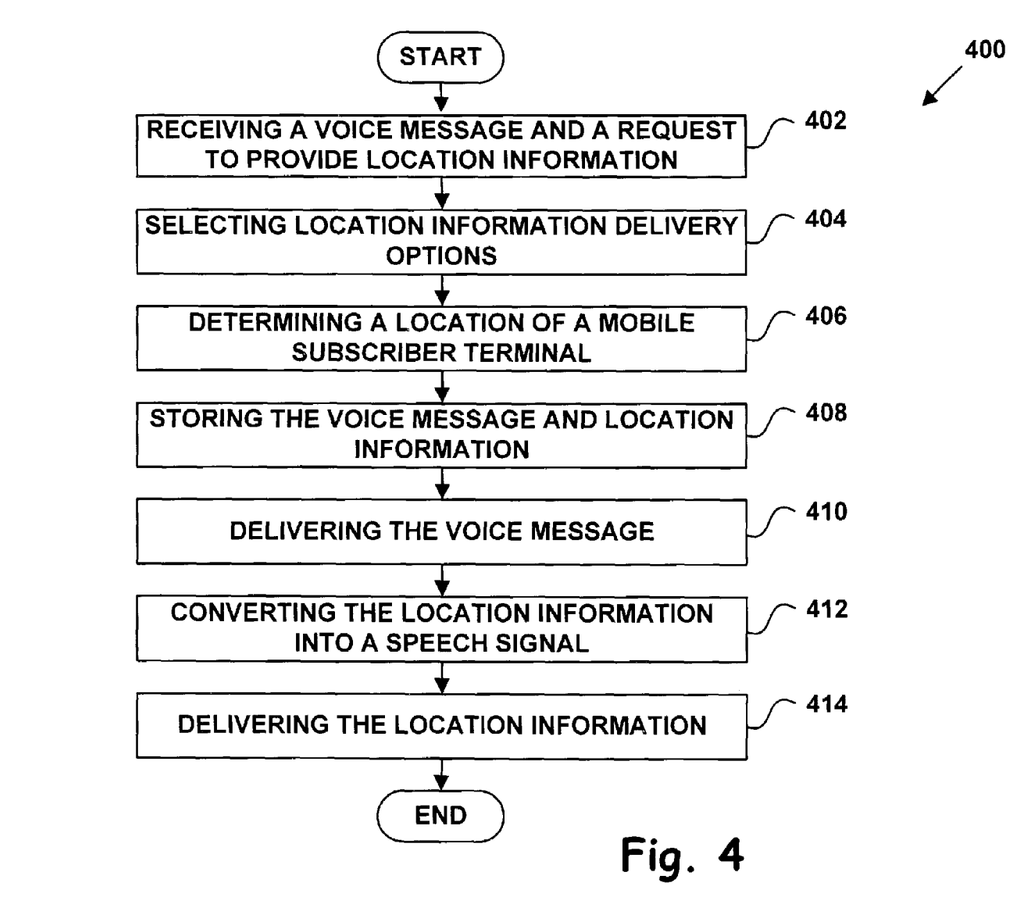
FIG. 4 is a flow chart of a method for delivering location information through a voice messaging system, according to another exemplary embodiment.

FIG. 4 is a flow chart of a method 400 for delivering location information through a voice messaging system, according to another exemplary embodiment. In this embodiment, the location information may be stored in the voice messaging system 208 as a location tag. When the location information is requested by the party, the location tag may then be converted into a speech signal.

At block 402, when the party is unavailable or chooses not to accept a call, the mobile subscriber may be directed to a voice messaging system 208. Alternatively, the mobile subscriber may directly call the party's voice mailbox. The mobile subscriber may be directed by the IVRU 214 located on the voice messaging system 208 to press a key or combination of keys on the mobile subscriber terminal 202 if the mobile subscriber wishes to have his location information be made available to the party. Alternatively, the mobile subscriber may make the appropriate key strokes without being directed by the IVRU 214. The key stroke combination may cause one or more DTMF signals to be sent to the voice messaging system 208.

At block 404, the mobile subscriber may be directed by the IVRU 214 to select various options regarding delivery of the location information. For example, the mobile subscriber may be able to prevent the party from forwarding the location information to a third party. As another example, the mobile subscriber may be able to limit the time in which the location information is available for access by the party. For example, the location information may only be available for 24 hours after the voice message is left in the party's voice mailbox. As yet another example, the mobile subscriber may be able to limit the number of times the party can retrieve the location information. Other options may be available to the mobile subscriber.

Additionally, the mobile subscriber may indicate when the location system 206 may obtain the location of the mobile subscriber terminal 202. For example, the location system 206 may only be permitted to obtain the location of the mobile subscriber terminal 202, either while the mobile subscriber is leaving the voice message and/or when the other party retrieves the voice message. As another example, the location system 206 may be permitted to obtain the location of the mobile subscriber terminal 202 for a period of time, allowing the party to track the mobile subscriber. Also, the mobile subscriber may indicate that a previous location of the mobile subscriber terminal 202 should be provided to the other party.

For each of the options, the mobile subscriber may be directed by the IVRU 214 to press a key or combination of keys on the mobile subscriber terminal 202. For example, the IVRU 214 may instruct the mobile subscriber to press "1" if he wishes to select delivery options regarding his location information. After pressing "1," the IVRU 214 may instruct the mobile subscriber which key to press next to obtain the desired options. As a result of the selections, an options field in the location tag may be set by the voice messaging system 208. For example, a logic 1 may be located in each field representing an option selected by the mobile subscriber.

At block 406, after receiving the one or more DTMF signals, the voice messaging system 208 may request the location of the mobile subscriber terminal 202 from the location system 206. The location system 206 may determine the location of the mobile subscriber terminal 202 and report the location to the voice messaging system 208. More specifically, the MPC 210 may select the PDE 212 to obtain the mobile subscriber terminal's location. The PDE 212 may obtain the location and forward a location tag containing a data representation of the mobile subscriber terminal's location to the MPC 210. The MPC 210 may send the location tag to the voice messaging system 208. The voice messaging system 208 may set the option fields in the location tag as selected by the mobile subscriber.

At block 408, the voice messaging system 208 may then store voice message and the location tag with the options set in the memory store 218. The voice message may be converted into a digital bit stream prior to storage. The analog-to-digital converter in the voice-processing unit 216 may perform the conversion.

At block 410, the party may retrieve the voice message from the voice messaging system 208. The digital-to-analog converter in the voice-processing unit 216 may convert the stored voice message into an analog speech signal. Additionally, the voice messaging system 208 may indicate that location information is available. For example, the voice messaging system 208 may provide an audible tone indicating that location information is available. Alternatively, the IVRU 214 may inform the party that location information is available. Additionally, the IVRU 214 may inform the party of any options the mobile subscriber selected regarding the location information.

The UVRU 214 may instruct the party to press a key or combination of keys on her phone if the party wishes to retrieve the location information. The party may be instructed to press the same or a different series of keys than what the mobile subscriber pressed when leaving the message. If the party indicates that she wants to retrieve the location information of the mobile subscriber, the voice messaging system 208 may provide location information obtained from the location system 206.

At block 412, the voice messaging system 208 may convert the location tag into a speech signal. The voice messaging system 208 may include a text-to-speech converter operable to convert the location tag into a speech signal. Alternatively, another entity may convert the location tag into a speech signal and provide the speech signal to the voice messaging system 208 for delivery. Additionally, the voice messaging system 208 may convert the data in the location tag into more user-friendly format, such as a street address, driving instructions, or a map.

At block 414, the voice messaging system 208 may deliver the location information to the party. Prior to delivering the location information to the party, the voice messaging system 208 may check the location tag to determine which options, if any, were selected regarding the delivery of the location information. The voice messaging system 208 may also check the location tag if the party tries to forward the location information to a third party.

Depending on the options selected by the mobile subscriber, the party may receive the location of the mobile subscriber terminal when the mobile subscriber left the voice message or when the party retrieved the voice message. The party may receive the location information multiple times. For example, the party may receive the location information upon retrieving the voice message a first time and may save the message in the voice mailbox. As is well known in the art, the party may retrieve the saved voice message additional times after retrieving the message the first time.

Alternatively, the party may obtain updated location information, which may allow the party to track the mobile subscriber. For example, the voice messaging system 208 may query the location system 206 each time the party retrieves the voice message. If the mobile subscriber terminal 202 is activated, the location system 206 may send the voice messaging system 208 with a new location tag. The party may incur an expense each time the location information is received.

Further, the mobile subscriber may be able to select location information from a previously stored location of the mobile subscriber terminal 202. For example, the mobile subscriber may direct the location system 206 to store the location information of the mobile subscriber terminal 202 when the mobile subscriber is at a particular place (e.g., a store, a park, a theater, or other location). Later, when the mobile subscriber is located elsewhere, the mobile subscriber may have the previously stored location information be made available to the party.

The system and methods described provide a secure delivery method for transmitting location information to the party through the voice messaging system 208. The mobile subscriber may be able to select options limiting the party's access to the location information and preventing the party from forwarding the location information to third parties. In this way, the mobile subscriber is able to provide his location information to the party without requiring the party's name to be placed on a pre-approved list of parties that are authorized to receive such information. Additionally, the mobile subscriber can provide his location information to the party without requiring special equipment.

An exemplary embodiment of the present invention has been described above. Those skilled in the art will understand; however, that changes and modifications may be made to this embodiment without departing from the true scope and spirit of the present invention, which is defined by the claims.

We claim:

1. A method of conveying location information through a voice messaging system, the method comprising: a voice messaging system receiving and storing a voice message from a first party operating a mobile subscriber terminal; the voice messaging system obtaining a current location of the mobile subscriber terminal from a location system and storing the current location information; and thereafter, the voice messaging system receiving a request from a second party to retrieve the voice message, and the voice messaging system providing the second party with the voice message and the location information in the form of speech; and wherein the location information is converted into a speech signal prior to storing the location information.

2. The method of claim 1, wherein the location information is stored as a digital bit stream representative of a speech signal.

3. A method of conveying location information through a voice messaging system, the method comprising:
  a voice messaging system receiving and storing a voice message from a first party operating a mobile subscriber terminal; the voice messaging system obtaining a current location of the mobile subscriber terminal from a location system and storing the current location information; and thereafter, the voice messaging system receiving a request from a second party to retrieve the voice message, and the voice messaging system providing the second party with the voice message and the location information in the form of speech; wherein the location information is stored as a location tag, and wherein the location tag is converted into a speech signal prior to providing the location information to the second party.

4. The method of claim 1, wherein the voice messaging system includes an interactive voice response unit.

5. The method of claim 4, wherein the interactive voice response unit is a VoiceXML software application.

6. The method of claim 4, wherein the interactive voice response unit directs the first party to request that the voice messaging system provide the location information to the second party.

7. The method of claim 1, wherein obtaining the location of the mobile subscriber terminal comprises querying a location system and receiving the location information from the location system.

8. The method of claim 7, wherein the location system includes a mobile position center and a position determining entity.

9. The method of claim 8, wherein the mobile position center comprises a database application that receives the location information from the position determining entity, wherein the mobile position center forwards the location information to the voice messaging system.

10. The method of claim 8, wherein the position determining entity is operable to process position information obtained from the mobile subscriber terminal.

11. The method of claim 8, wherein the position determining entity transmits a location tag containing the location information to the mobile position center.

12. The method of claim 1, further comprising the voice messaging system receiving a selection of at least one location information delivery option.

13. The method of claim 12, wherein the at least one location information delivery option is selected from the group consisting of whether the location information can be forwarded to a third party, how long the location information is available, how often the second party can retrieve the location information, and when the location information can be obtained.

14. The method of claim 1, further comprising:
  the voice messaging system informing the second party that the location information is available.

15. The method of claim 1, further comprising:
  the voice messaging system receiving a request from the second party to determine a location of the mobile subscriber terminal when retrieving the voice message from the first party.

16. The method of claim 1, further comprising:
  the voice messaging system receiving a request from the first party to provide previously stored location information, wherein the previously stored location information is based on a location of the mobile subscriber terminal prior to the voice messaging system receiving the voice message from the first party; and
  thereafter, the voice messaging system providing the second party with the previously stored location information.

17. The method of claim 1, further comprising:
  providing the location information for a period of time allowing the second party to track the location of the mobile subscriber terminal.

18. The method of claim 1, wherein the location information is selected from the group consisting of longitude and latitude coordinates, cell and sector information, street address, and driving directions.

19. The method of claim 1, wherein the second party retrieves the voice message using a device selected from the group consisting of cellular telephone, landline telephone, a personal digital assistant, and a computer.

20. The method of claim 1, wherein the voice messaging system provides the location information to the second party without checking a pre-approved list of authorized parties.

21. A system for delivering location information through a voice messaging system of a mobile subscriber terminal, comprising in combination: a location system operable to determine a location of the mobile subscriber terminal; and a voice messaging system operable to receive and store a voice message from a first party using the mobile subscriber terminal, obtain the location of the mobile subscriber terminal from the location system, and deliver the voice message and location information based on the location of the mobile subscriber terminal to a second party, the location information delivered in the form of speech; and wherein the location information is converted into a speech signal prior to storing the location information.

22. The system of claim 21, wherein the location system includes a mobile position center and a position determining entity.

23. The system of claim 22, wherein the mobile position center comprises a database application that receives the location information from the position determining entity, wherein the mobile position center forwards the location information to the voice messaging system.

24. The system of claim 22, wherein the position determining entity is operable to process position information obtained from the mobile subscriber terminal.

25. The system of claim 21, wherein the voice messaging system includes an interactive voice response unit.

26. The system of claim 25, wherein the interactive voice response unit is operable to direct the first party to request that the voice messaging system obtain the location of the mobile subscriber terminal.

27. The system of claim 25, wherein the interactive voice response unit is a VoiceXML software application.

28. The system of claim 21, wherein the location information is selected from the group consisting of longitude and latitude coordinates, cell and sector information, street address, and driving directions.

29. The system of claim 21, wherein the voice messaging system delivers the location information to the second party without checking a pre-approved list of authorized parties.

30. A voice messaging system, comprising in combination: a processor; data storage; and machine language instructions stored in the data storage executable by the processor, in response to a voice message from a first party operating a mobile subscriber terminal, to: determine a location of the mobile subscriber terminal; store the voice message and location information based on the location of the mobile subscriber terminal; and responsive to receiving a request from a second party to retrieve the voice message, provide the voice message and location information to the second party; and a text to speech converter for converting the location information into speech wherein the location information is provided to the second party in the form of speech; and wherein the location information is converted into a speech signal prior to storing the location information.

\* \* \* \* \*